United States Patent [19]

Lonergan

[11] Patent Number: 5,698,248
[45] Date of Patent: *Dec. 16, 1997

[54] COATED DEHYDRATED FOOD PIECES AND A PROCESS FOR MAKING THE COATED DEHYDRATED FOOD PIECES

[75] Inventor: Dennis A. Lonergan, Medina, Minn.

[73] Assignee: The Pillsbury Company, Minneapolis, Minn.

[*] Notice: The term of this patent shall not extend beyond the expiration date of Pat. No. 5,612,075.

[21] Appl. No.: 721,251

[22] Filed: Sep. 26, 1996

Related U.S. Application Data

[63] Continuation of Ser. No. 483,443, Jun. 7, 1995, Pat. No. 5,612,075.

[51] Int. Cl.$^6$ ....................................... A23L 1/216
[52] U.S. Cl. ..................... 426/99; 426/96; 426/98; 426/102; 426/289; 426/293; 426/295; 426/302; 426/303; 426/307; 426/637
[58] Field of Search ............................. 426/98, 99, 102, 426/289, 293, 295, 302, 303, 637, 89, 96, 307

[56] References Cited

U.S. PATENT DOCUMENTS

| | | |
|---|---|---|
| 1,806,302 | 5/1931 | Magrill . |
| 3,582,336 | 6/1971 | Rasmusson .................... 99/83 |
| 3,615,647 | 10/1971 | Kassena ........................... 99/2 |
| 3,830,941 | 8/1974 | Luft et al. ...................... 426/177 |
| 4,251,551 | 2/1981 | Vanhulle et al. ................. 426/94 |
| 4,517,204 | 5/1985 | Mottur ............................ 426/94 |
| 4,530,848 | 7/1985 | Bannon et al. ................. 426/293 |
| 4,640,837 | 2/1987 | Coleman et al. ................ 426/94 |
| 4,767,636 | 8/1988 | Ramos et al. ................... 426/291 |
| 4,769,247 | 9/1988 | Rothenberg et al. ........... 426/291 |
| 4,961,943 | 10/1990 | Blanthorn et al. .............. 426/102 |
| 4,985,262 | 1/1991 | Camire et al. .................. 426/302 |
| 5,071,661 | 12/1991 | Stubbs et al. ................... 428/96 |
| 5,141,759 | 8/1992 | Sloan et al. .................... 426/102 |
| 5,260,078 | 11/1993 | Spicer .............................. 426/96 |
| 5,436,015 | 7/1995 | Patterson et al. ............... 426/303 |
| 5,612,075 | 3/1997 | Lonergan ........................ 426/99 |

FOREIGN PATENT DOCUMENTS 1293527  10/1972  United Kingdom ............. A23L 1/12

OTHER PUBLICATIONS

Sherman, P., Industrial Rheology, 1970, Academic Press, London & New York.
DeMan, J.M., et al, Rheology and Texture in Food Quality, 1976, The AVI Publishing Company, Inc., Westport, CT.
Green, Henry, Industrial Rheology and Rheological Structures, 1949, John Wiley & Sons, Inc., New York.

*Primary Examiner*—Lien Tran
*Attorney, Agent, or Firm*—Janal M. Kalis; Aleya Rahman

[57] ABSTRACT

A method of forming a food product that includes dehydrated food pieces coated with a preselected amount of edible particles. The method includes providing dehydrated food pieces having outer surfaces. Next, a fat is provided that is substantially solid at room temperature and substantially flowable at a temperature of at least 90 degrees Fahrenheit. The fat is preheated to a temperature which is at least hot enough to cause the fat to flow. Next, food pieces are coated on their outer surfaces with the flowable fat and are further coated with coating particles. The resulting coating is nonflowable even at temperatures which exceed a temperature which caused a majority of the fat without the particles to flow.

16 Claims, No Drawings

COATED DEHYDRATED FOOD PIECES AND A PROCESS FOR MAKING THE COATED DEHYDRATED FOOD PIECES

This is a Continuation of application Ser. No. 08/483,443, filed on Jun. 7, 1995 now U.S. Pat. No. 5,612,075.

The present invention relates to dehydrated food products. In particular, it relates to a method of forming a dehydrated food product coated with a preselected amount of edible particles.

BACKGROUND OF THE INVENTION

Convenience products such as pre-packaged potato flakes are popular because varying portion sizes can be prepared in a relatively short amount of time.

Consumers also have enjoyed the availability of many products which can be prepared in varying portion sizes such as the instant pasta dish disclosed in Rothenberg et al. U.S. Pat. No. 4,769,247. Rothenberg et al. describes a process for coating dried pasta with a heated fat which melts at a temperature above room temperature, and which is coated with dry ingredients and coated again with fat to encapsulate the dry ingredients. Because the seasonings are applied to the surface of the pasta, any amount of the pasta can be prepared, and the correct amount of seasoning applied to that portion is assured.

Products have been developed which can be prepared an varying portion sizes and which employ fat as a component of the product coating. For example, Kassens U.S. Pat. No. 3,615,647 describes an animal food coating comprising a layer of melted fat such as tallow, coated with an aqueous solution of dextrinized starch. When the water is evaporated from the starch solution, the animal food pellet and fat is encapsulated. In this product, the melting temperature of the fat is relatively unimportant because the starch is capable of encapsulating the fat, regardless of whether the fat is in a substantially solid or liquid state.

Another example of a food product having a fat component in its coating is described in Van Hulle et al. U.S. Pat. No. 4,251,551. In this example, a puffed food product is described which is coated with an edible fatty triglyceride such as coconut oil or corn oil, and then is coated with dehydrated cheese solids. There is no criticality to the melting point of the edible fat.

Ramos et al. U.S. Pat. No. 4,767,636 describes a coated rice and sauce dish including a rice substrate, a layer of oil coating, a layer of portion controlled sauce-forming ingredients and an outer layer of oil coating. A partially hydrogenated vegetable oil that is a liquid at room temperature can be used to form this product. There is no criticality to the temperature at which the oil layers melt.

McDonald et al. U.K. patent 1,293,527 describes a process for making a controlled portion mashed potato product from dehydrated potato flakes, edible fat and edible powder. The edible fat sprayed onto the flakes must be heated if the selected fat is a solid at room temperature.

Rasmusson U.S. Pat. No. 3,582,336 describes a coating, or "cladding component" for cereal products such as flakes, puffed cereal, shredded cereal or germ. The cladding component includes a vegetable oil which is substantially solid at room temperature, milk solids and sugar or a sugar substitute. Examples of suitable vegetable oils are corn oil, cotton seed oil, olive oil, palm oil, peanut oil, rice bran oil, soybean oil, sunflower oil and mixtures. The oils are modified such that the oil melts between about 96 and about 110 degrees F. The modification also increases the shelf life of the oil. The mixture is sprayed onto the cereal products. The mixture can also be used as an adherent of other particles.

SUMMARY OF THE INVENTION

The present invention includes a method of forming a food product that includes dehydrated food pieces coated with a preselected amount of edible particles. The method includes providing dehydrated food pieces having outer surfaces. Next, a fat is provided that is substantially solid at room temperature and substantially flowable at a temperature of at least 90° F. The fat is preheated to a temperature which is at least hot enough to cause the fat to flow. Next, the food pieces are coated on their outer surfaces with the flowable fat, forming fat-coated surfaces. The fat-coated surfaces of the pieces are further coated with a preselected quantity of edible coating particles, forming a fat and particle coating. The coated food particles are cooled to ambient temperature. At ambient temperature, the fat and particle coating is nonflowable and adheres to the surface of the food pieces. The fat and particle coating is substantially nonflowable even at temperatures which exceed a temperature which caused a majority of the fat without the particles to flow.

The present invention also includes a food product that includes food pieces coated with a preselected amount of edible particles and oil.

DETAILED DESCRIPTION OF PREFERRED EMBODIMENTS

The method of the present invention makes a potato product that includes dehydrated potato pieces coated with a preselected amount of edible particles. The method includes steps of providing dehydrated potato pieces having outer surfaces and providing a fat that is substantially solid at room temperature and which is substantially liquid and flowable at a temperature preferably of at least about 90 degrees Fahrenheit. The fat is preheated to a temperature which is at least hot enough to cause the fat to flow. The outer surfaces of the potato pieces are coated with the flowable fat, forming fat-coated surfaces. The fat-coated surfaces are then coated further with a preselected quantity of edible particles, forming a fat and particle coating. The coated potato pieces are then cooled to ambient temperature, which results in a substantially nonflowable fat and particle coating that adheres to the surfaces of the potato pieces. The cooled fat and particle coating is substantially nonflowable even at temperatures which exceed a temperature which caused a majority of the fat without added particles to flow. The present invention also includes the product made by the method.

By "flow" and "flowable" is meant that the fat deforms incrementally when subjected to a shear stress. By "solid" is meant that the fat does not substantially deform until subjected to a shear stress that fractures the fat.

It has unexpectedly been found that coating a potato slice with a fat that is substantially nonflowable at room temperature and substantially flowable at a temperature of at least 90 degrees Fahrenheit and applying particles to the coated potato slice causes the fat on the potato slice to remain substantially nonflowable even when the potato slice coated with the fat and particle coating is exposed to a temperature which would cause the fat itself to flow.

The method of the present invention makes a potato product that permits a consumer to cook or bake any desired quantity of coated potatoes in order to prepare either a single serving or a collection of servings. The product may be cooked in a conventional oven, on a stovetop or in a microwave oven. Thus, the product of the present invention gives the consumer portion control and allows the consumer to use the product to suit the consumer's specific needs. As a consequence, the product of the present invention reduces food waste.

It has also unexpectedly been found that because the fat remains nonflowable above its melting point in the presence of the edible coating particles, the coating does not come off the potato pieces either during manufacturing or storage at a temperature which would cause the fat alone to flow or when the potato pieces are heated.

Further, upon cooking, the coating has an organoleptically desirable "melt in your mouth" feel. Because of the method of the present invention, it is possible for a consumer, in a relatively short period of time, to prepare a single serving or any number of servings of a potato preparation such as potatoes au gratin, cheese scalloped potatoes or potatoes and gravy with the product of the present invention.

In one preferred embodiment, the potatoes are dehydrated, sliced potatoes that have been dried to a moisture of about 7% by weight. An acceptable moisture range for the dehydrated potatoes is 2% to 8% by weight. The preferred dehydrated potatoes have a thickness of about 5/32nds inches. An acceptable thickness range is from about 1/10 to 7/32 inches. Potato pieces too thin tend to fracture and form fines. Potato pieces too thick do not properly hydrate when cooked. The dehydrated potato slices have an outer surface that is substantially smooth. The acceptable dehydrated potatoes have a diameter that is within a range of about one to two inches.

The fat may be an oil or shortening and preferably has a melting point that is within a range of about 90–98 degrees Fahrenheit to impart a "melt in your mouth" feel. The fat is solid at about 70 degrees Fahrenheit. The preferred fat has a heat of fusion that is about 24 calories per gram and a specific heat that is about 0.5 calories per gram per degree Centigrade. Preferred fats include hydrogenated soybean oils corn oil, soybean oil, safflower oil, palm oil, and coconut oil. Various types of hydrogenated soybean oils were tested and some were found to be acceptable. The oils tested had different degrees of crystallization. The preferred oils had a saturated fat index within a range of 10 to 57% by weight at 20 degrees Centigrade. The oil may optionally include an emulsifier and/or and antioxidant. The oil or shortening may be any food grade fat meeting the criteria described and may be available in any form such as flakes or as solid blocks.

In a more preferred embodiment, a fat having a high solids content meeting the criteria described is employed. It has unexpectedly been found that when the high solids fat adheres to the surface of a dehydrated potato and picks up flavor and texture particles to form a coating, the actual yield stress required to deform the fat and particle coating is of a magnitude that is about 1.5 to 2 times greater than the magnitude of predicted yield stress. The predicted yield stress is based upon the yield stress of a liquid oil to which solids have been added. The solids were added in substantially the same volume fraction as solids naturally occurring in the high solids fat so that the volume displaced was substantially the same as for the naturally high solids fat. However, the magnitude of the yield stress required for the naturally high solids oil was surprisingly, substantially greater. The high solids shortening may be obtained from Abitech Corp., located in Columbus, Ohio.

The edible coating particles applied to the fat coated potato slices include, in one embodiment, cheese and whey powders in a concentration of about 20 to 40% by weight of the particles. In one embodiment, the coating particles also include starch in a concentration of 30 to 60% by weight, and spices and flavors in a concentration of about 10 to 30% by weight.

In one embodiment, the specific heat of the coating particles is about 0.6 calories/gm./degrees Centigrade. The coating particles may be preblended and stored or may be blended just prior to application. The blended coating particles do not have a propensity to either form lumps or to dust.

In a more preferred embodiment, about 15 to 20 grams of the fat is retained on the outer surfaces of about 100 grams of dried potato slices. The fat is retained on the outer surface of each potato slice when the potato slices are exposed to fat as described below. The fat on the outer surfaces of the potato slices is capable of picking up coating particles and of adhering the particles on the slice surface. The surface is typically smooth such as for a dehydrated potato. Other smooth or rough surfaced foods may also be acceptable. It is surprising that the coating oft he present invention is equally applicable to both smooth and rough surfaces and does not rely on intersticial surface area or absorption to remain coated on the food surface. Preferably, the fat can pick up an amount of particles sufficient to increase thickness of each fat and particle coated potato slice by about 25% over the thickness of each potato slice alone.

With the preferred fats tested, the concentration of fat adhering to the potatoes ranged from about 15.5% of oil coated potato weight to about 20.5% of coated potato weight over a temperature range of about 150 to 180 degrees Fahrenheit.

The percent of particle pick-up ranged from about 44.5% to 56 percent by weight of the particle coated potato over a temperature range of about 150 to 180 degrees Fahrenheit. Other preferred embodiments had a particle pick up within a range of about 25 percent to 45 percent by weight.

As discussed, when the preferred fats pick up coating particles, the fats show an unexpected resistance to shear stress as demonstrated by a resistance to flow. As shown in the table below, the yield stress increases with an increasing concentration of coating particles.

| | Yield Stress (dynes/cm$^2$) | | |
|---|---|---|---|
| % Added Particles | Expected | Lig. Oil | High Solids |
| 50 | 9294 | 0.036 | 15939 |
| 60 | 17001 | 10.70 | 33109 |
| 70 | 28612 | 855.6 | Off Scale |
| 74 | 36000 | 4328.2 | Off Scale |

The yield stress of the liquid oil was measured by using a Brookfield Viscometer, model HB with an LV1 cylindrical spindle. The yield stress of the high solids fat was measured with an Instron capillary extrusion instrument, with a reservoir of 1.125" in diameter and 3" in length, and a 5" long capillary. Both ⅛" and ¼" wide capillaries were used to measure yield stress depending on the fat viscosity with increasing added particle concentration, but as evidenced above, at higher levels the fat became too viscous to measure accurately. The data was analyzed using linear regression based Casson equation calculations.

As discussed, the theoretical values are based upon a proportionality between yield stress and the cubic volume fraction of solids. More precisely, yield stress of a material is proportional to the volume fraction of solids in the material, raised to the power of three. The relationship between percent of dry mix solids in fat and actual yield stress obtained is shown graphically in FIG. 6 for an oil without a high solids content and a shortening with a high solid fat content. From these values, it can be seen that the yield stress value of a coating of the present invention significantly exceeds the expected values based on the volume fraction of solids in the coating.

It is believed that this surprising increase in yield stress value contributes to the unexpected phenomenon observed in the present invention. It was observed that the fat crystallization temperature point is not altered by particle addition. One preparation was a high solid fat without particles (SF, Predicted). Another preparation was the same high solid fat with added dry particles of a cheese dry mix blend (SF, Observed). Other preparations included a liquid fat alone (LF, Predicted) and the same liquid fat with particles as described above (LF, Observed). As can be seen, both of the fat preparations that included particles had about the same crystallization temperature profile as the corresponding fat preparations without particles, indicating that the particles did not significantly effect crystalliation properties.

Thus, the fat in a fat and particle coating was found to have the same crystallizing properties as the fat alone. It has also been found that for fats having a percent crystalline fat within a range of 12 to 58 percent, the dry particle pick-up ranges from about 47 to 51 percent. Thus, the degree of crystallinity does not substantially effect the dry particle pick-up by the oiled potatoes once the fat crystalline content exceeds about 12 percent by weight.

It is believed possible that the solid flavor particles physically interact with solids in the fat so that the fat solids locally interact with the particles to form "agglomerates." These "agglomerates" may alter the flow properties of the fat, thereby forming the coating of the present invention.

Prior to exposure to oil, the sliced potatoes are conveyed to the oil in a conveying device that enables a substantially uniform weight of potatoes to be exposed to the oil. Suitable conveyance devices include weigh belts and other conventional conveyors known to those skilled in the art. The conveyor may be continuous, semi-continuous or batch, depending upon the specific process desired.

Exposure of the oil to the potatoes may occur in one of several embodiments. In one preferred embodiment, dried potato slices conveyed to the oil are exposed to heated oil when the oil is sprayed onto the potatoes. The oil most preferably has a temperature of about 155 to 160 degrees Fahrenheit. An acceptable range is 130 to 200 degrees Fahrenheit. It is desirable to maintain temperatures with an accuracy of ±5 degrees Fahrenheit. The temperature of the oil is optimal when the flavor particle pick-up by the oil is optimal.

The oil may be sprayed onto a conveyor belt conveying the potatoes. In this embodiment, the oil is acceptably sprayed from above the conveyor, below the conveyor or both above and below the conveyor.

In another spraying embodiment, the potatoes are conveyed to a rotating drum. In the drum is a nozzle that delivers the hot oil in a spray into the drum. The potatoes are rotated until the surface area is covered with oil. The duration and intensity of rotation of the potatoes is controlled in part by the desire to keep potato fines generation low. Other conventional types of spraying operations are also suitable for use in the method of the present invention.

In one other embodiment, the potatoes are dipped in hot oil, also, most preferably, at a temperature of about 155 to 160 degrees Fahrenheit. The hot oil dip includes a hot oil bath. The potatoes may be dipped in a strainer or basket. The potatoes may also be dipped while on a wire mesh conveyor belt. For both oil spraying and oil dipping, the oil is made available to the potato outer surface in a concentration greater than is necessary to coat the potato to ensure maximum oil pickup.

Once the oil has been applied to the outer surface of the potatoes, coating the outer surface, the potatoes are transferred to an operation that applies particles to the coated outer surface of the potatoes. The particles are applied in order to make a sauce for the potatoes when the consumer adds water and heats the product. The particles include flavoring particles and texturizing particles. The particles are applied to the potato in a concentration range of about 25% to 45% by weight of the coated potato product.

In one preferred embodiment, oil coated potatoes are coated when the particles are sprayed into a drum. The particles are sprayed into the drum in an excess amount.

A ratio of oil to potato slices has a direct correlation to dry coating pick-up. Coating pick-up of the potato slices ranges from about 20 to 60% as the ratio of oil to potato slices varies from 14 to 20%.

It has been found that when the coating powder is sprayed into a drum with the oiled potatoes, an excess of powder typically remains in the drum and related process equipment. This excess powder may be recycled and re-used.

Once the potatoes have been oiled and the solid particles have been applied to the potatoes, the potatoes are optionally transferred to a "shake" drum. Excess dry coating particles that have not contacted the fat on the potato surface are shaken off by the rotating action of the drum, and the excess particles are recycled to the coating drum. The coated potatoes are then cooled and packaged.

With respect to oil temperature, a range of 155 to 160 degrees Fahrenheit is most preferred because as the oil temperature increases, oil pickup of the particles decreases. This is believed to occur because as oil temperature increases, less oil is picked up. Therefore fewer particles are picked up. It has been found that the entire surface of the potato does not need to be coated in order to make the potato product of the present invention.

It is believed that the application of both the oil and the particles to the surface of the potato creates a thixotropic-like fluid that includes the oil and the particles. Thus, like a conventional thixotropic fluid, the viscosity of the oil and particles is dependent upon shear instantaneously applied and the time to set when at rest.

Because the fluid is thixotropic-like and its crystallization properties are substantially unchanged, the fluid may be heated to make a sauce and retains a "melt in your mouth" organoleptic feature. Further, because the fluid is thixotropic-like, the fluid coating the potato is tightly adhered to the surface of the potato. Because each potato piece has been treated to have a desired amount of sauce-making material adhered to it, the consumer may take the number of potato slices desired to make a meal portion.

The coating of the coated potato is characterized by a particle gradient within a fat medium. The particle concentration is greatest closest to the outer surface of the potato and tapers off further away from the surface. Once applied to the dehydrated particles, such as potatoes, the fat and edible particle mixture remains non-flowable at a temperature of 115° F. for about four days.

While a potato coated with oil and particles has been described, it is contemplated that other types of foods may be coated with a suitable oil and particle blend. For instance, it is contemplated that pasta may be coated with oil and red sauce-based particles, or white sauce based particles. It is also contemplated that other vegetables such as sweet potatoes and fruits such as apples may be coated with suitable particles. It is also contemplated that grains such as rice may be coated with suitable particles.

The following examples are presented to describe specific embodiments of the method and product of the present invention and are not intended to limit the present invention.

EXAMPLE I

Dried potato slices were sprayed with oil in a drum and were coated with dry flavoring particles in the drum. The dried potato slices were transferred to a vibratory hopper where the potatoes were screened to remove fines. From the vibratory hopper, the potatoes were transferred to a gravimetric weigh belt.

The potato slices were fed to a drum for oil coating at a rate of about 725 lb. per hour. The oil spray application was performed in a drum manufactured by Spray Dynamics of St. Clair, Mo.

The coating oil had a saturated fat index of 57 at 20 degrees Centigrade. The coating oil was maintained at a temperature of 155° to 160° F. in a use tank. The coating oil was sprayed onto the slices of potatoes at an exit end of the drum to make oiled slices. The oil was added to the drum at a rate of about 110 lb. per hour. These oiled slices were transferred from the oiling drum onto an infeed conveyor to a solid coating device.

The solid coating device employed was the DB-4 Breading Machine, manufactured by Stein Inc. of Sandusky, Ohio. In the solid coating device, an excess amount of solid flavoring particles were added.

It was observed that with the oil temperature range used, an even coating of dry material gave the finished product a very good appearance. The finished product did not appear wet nor did the product display solids sloughing.

It was observed that the oil to potato slice ratio had a direct correlation with dry coating pickup. The coating pickup ranged from about 20 to 60% by weight as the ratio of oil to potato slices varied from about 14 to 20% by weight. Thus, it was observed that controlling the feed rate of potato slices into the oiling drum had a significant impact on dry coating pickup.

EXAMPLE 2

Au Gratin Coated Potatoes Made with a Particle Pick-Up of 36% of Potato Weight and 45% of Coated Potato Weight One embodiment of the product of the present invention is an Au Gratin coated potato. The Au Gratin coated potato is prepared with two embodiments. A first embodiment had a percent dried pickup on a potato weight basis of about 45% of potato weight. A second embodiment had a percent dry pickup of about 36%. The specific ingredients of each of these embodiments are described in Table 2.

The AuGratin coated potatoes having a dry particle pick-up of 36% by weight of the coated potato were made using the same process equipment described in Example 1. The AuGratin coated potatoes were also made in a bench top batch process. In this process, the potato slices were dipped in heated oil. In one set of process runs, about 400 grams of potatoes were coated with oil and dry particles. The potatoes were coated with oil at an average temperature of about 162.7 degrees Fahrenheit. An average of about 63.6 grams of the oil were adhered to the 400 grams of potatoes.

The oil coated potatoes were coated with the dry particle mixture described in the Table below for the 36% pick-up in the equipment described above. The residence time for the oil coated potatoes in the solid coating device was about 10 seconds. The coating device had a drum angle of 5.25 degrees for one set of runs and 6 degrees for another set of runs. The average dry weight percent of the dry particles with respect to the total of potato weight and oil was 36.06%.

TABLE I

| AuGRATIN COATED POTATOES | | |
|---|---|---|
| % Dry Pickup (potato Basis) | 45% | 36% |
| Potatoes | 68.9 | 66.0 |
| Hydrogenated Soybean Oil | 11.4 | 11.3 |
| Corn Starch | 8.8 | 4.8 |
| Modified Corn Starch | 4.7 | 4.3 |
| Whey | 4.2 | 2.2 |
| Salt | 3.1 | 2.9 |
| Dried Cheddar Cheese | 1.8 | 1.7 |
| Dried Blue Cheese | 1.3 | 1.2 |
| Onion Powder | 1.2 | 1.1 |
| Sodium Phosphate | 1.2 | 1.1 |
| Reduced Lactose Whey | 1.0 | 0.9 |
| Maltodextrin | 0.7 | 0.6 |
| Baking Soda | 0.6 | 0.5 |
| Sodium Aluminum Phosphate | 0.5 | 0.4 |
| Garlic Powder | 0.3 | 0.3 |
| Citric Acid | 0.3 | 0.3 |
| Spice | 0.2 | 0.2 |
| Nonfat Milk | 0.1 | 0.1 |
| Xanthan Gum | 0.1 | 0.1 |
| Sodium Bisulfite | 0.02 | 0.02 |
| Color | 0.01 | 0.01 |
| Lactic Acid | 0.0017 | 0.0016 |

AuGratin coated potatoes were prepared as described. The potatoes had a fat concentration of 14.21% by weight of the coated potatoes and a dry coating concentration of 25.07% by weight. The total coating concentration was 45% by weight.

EXAMPLE 4

Cheese Scallop Coated Potatoes with a Solid Particle Pick-Up of 34%

Cheese scalloped coated potatoes were prepared with dry particles having the composition described in the table below. The potatoes had an oil concentration of 10.20% by weight of the coated potato, a dry particle concentration of 23.8% by weight and a total coating of 34.% by weight. When heated, the coated potatoes had a sauce concentration of 23.8.% by weight, an oil concentration of 10.2% by weight, and a potato slice concentration of 66.0% by weight.

In one eight serving preparation, 148.5 grams of the cheese scalloped coated potatoes were combined with 3 cups of boiling water and 1 cup of milk.

| Cheese Scalloped Dry Particles | | |
|---|---|---|
| Ingredient | % Total | % Sauce |
| Corn Starch | 10.8 | 45.5 |
| Modified Corn Starch | 1.6 | 6.9 |
| Xanthan Gum | 0.1 | 0.5 |
| Cheddar Cheese Powder | 2.7 | 11.4 |
| Sweet Whey Solids | 2.7 | 11.4 |

-continued

Cheese Scalloped Dry Particles

| Ingredient | % Total | % Sauce |
| --- | --- | --- |
| Natural Flavor Enhancer | 0.1 | 0.6 |
| Salt | 3.0 | 12.5 |
| Onion Powder | 1.1 | 4.5 |
| Disodium Phosphate | 0.9 | 3.9 |
| Celery Granules | 0.3 | 1.1 |
| Paprika | 0.1 | 0.6 |
| Citric Acid | 0.2 | 1.0 |
| White Pepper | 0.1 | 0.2 |

EXAMPLE 5

Potatoes AuGratin were prepared in the manner described in Example 1. Once coated, the potatoes had a fat concentration of 10.2 percent by weight of the coated potato, a coating particle concentration of 18.0 percent by weight of the coated potato and a total coating that was 28.2 percent by weight of the coated potato. The potatoes were coated with the following mixture of dry particles:

| Ingredient | % total | % sauce |
| --- | --- | --- |
| Corn Starch | 6.8 | 37.9 |
| Xanthan Gum | 0.1 | 0.6 |
| Carrageenan | 0.1 | 0.4 |
| Cheddar Cheese Powder | 6.0 | 33.2 |
| Sweet Whey Solids | 0.7 | 3.7 |
| Dried Blue Cheese | 1.6 | 8.9 |
| Onion Powder | 1.1 | 5.9 |
| Disodium Phosphate | 0.9 | 5.0 |
| Garlic Powder | 0.3 | 1.5 |
| Citric Acid | 0.2 | 1.3 |
| Mustard Flour | 0.1 | 0.6 |
| White Pepper | 0.1 | 0.3 |
| Natural Flavor Enhancer | 0.1 | 0.7 |

Although the present invention has been described with reference to the preferred embodiments, workers skilled in the art will recognize that changes may be made in form and detail without departing from the spirit and scope of the invention.

What is claimed is:

1. A method of forming a food product including dehydrated food pieces selected from a group consisting of vegetables, fruits and grains coated with a preselected amount of edible particles, comprising:

providing dehydrated food pieces selected from the group consisting of vegetables, fruits and grains, having outer surfaces;

providing a high solids fat substantially flowable at a temperature of at least 90° F.;

heating the high solids fat to a temperature which is at least hot enough to cause the fat to flow;

coating the outer surfaces of the food particles with the flowable fat, forming fat-coated surfaces;

coating the fat-coated surfaces further with a preselected quantity of edible particles which are a mixture of 20–40% by weight dehydrated cheese and whey powders; 30–60% by weight starch; and 10–30% by weight spices and flavors, forming a fat and food particle coating; and cooling the coated food particles to ambient temperature, wherein the fat and edible particle coating is substantially non-flowable and adheres to the surfaces of the food pieces at ambient temperatures and wherein the fat and particle coating has an increased yield stress value as compared to the fat alone without substantially altering the crystalline properties of the fat, such that the fat and the particle coating is substantially non-flowable at a melting point temperature of the high solids fat.

2. The method of claim 1 wherein the fat is a partially hydrogenated soybean oil.

3. The method of claim 1 wherein the fat has solid fat index of 10–57% by weight solid or crystalline fat at 20° C.

4. The method of claim 1 wherein the oil is preheated between 130° and 200° F.

5. The method of claim 1 wherein the edible particles form a sauce upon rehydration of the coated dehydrated food pieces.

6. The method of claim 5 wherein the fat and edible particle coating is substantially nonflowable when stored for 4 days at up to 115° F.

7. The method of claim 1 wherein the flowable fat coating comprises between about 15 to 20 grams of fat per 100 grams dehydrated food pieces.

8. The method of claim 1 wherein the food pieces are food pieces having a moisture content of between about 5 and about 8% by weight, and having a thickness between about 1/10 and 7/32 inches.

9. The method of claim 1 wherein between about 30 and about 40 grams of edible particles per 100 grams of dehydrated food pieces are applied to the fat-coated surfaces.

10. A product made by the process of claim 1.

11. A food based product formed from an edible particle mixture comprising a dehydrated food piece selected from a group consisting of vegetables, fruits and grains, a coating on the outer surface of dehydrated food piece, each piece having an outer surface and comprising a fat that is substantially nonflowable at room temperature and which flows within a range of about 90° to 98° F., and further comprising a quantity of edible particles which are a mixture of 20–40% by weight dehydrated cheese and whey powders; 30–60% by weight starch; and 10–30% by weight spices and flavors, wherein the fat and edible particle mixture remains substantially nonflowable at a melting point temperature of the fat.

12. The food based product of claim 11 wherein the edible particle mixture comprises between 30 and about 40 grams per 100 grams of dehydrated food.

13. A food product of claim 10 wherein the fat is a partially hydrogenated vegetable fat selected from a group consisting of: corn oil, soybean oil, safflower oil, palm oil, and coconut oil.

14. A food based product formed from an edible particle mixture comprising:

a dehydrated food piece, selected from a group consisting of vegetables, fruitss and grains, each piece having an outer surface; and a coating on the outer surface of the dehydrated food piece comprising a fat that is substantially nonflowable at room temperature and which flows within a range of about 90 to 98 degrees Fahrenheit, and further comprising a quantity of edible particles which are a mixture of 20–40% by weight dehydrated cheese and whey powders; 30–60% by weight starch; and 10–30% by weight spices and flavors wherein the fat and edible particle mixture remains substantially nonflowable at a melting point temperature of 115 degrees F. for about four days.

15. The method of claim 1 wherein the food piece is selected from a group consisting of sweet potatoes, apples, and rice.

16. The product of claim 11 wherein the food piece is selected from a group consisting of sweet potatoes, apples, and rice.

\* \* \* \* \*

UNITED STATES PATENT AND TRADEMARK OFFICE
CERTIFICATE OF CORRECTION

PATENT NO. : 5,698,248
DATED : December 16, 1997
INVENTOR(S) : Dennis A. Lonergan It is certified that error appears in the above-indentified patent and that said Letters Patent is hereby corrected as shown below:

Col. 1, line 27, delete the word "an" and insert --in--.

Col. 3, line 45, delete the word "and" and insert --an--.

Col. 4, line 21, delete the words "oft he" and insert --of the--.

Col. 5, lines 2-6, delete the sentence "The relationship between percent of dry mix solids in fat and actual yield stress obtained is shown graphically in FIG. 6 for an oil without a high solids content and a shortening with a high solid fat content.

Col. 5, line 22, delete the word "crystalliation" and insert --crystallization--.

Col. 8, line 51, delete "34.%" and insert --34%--.

Col. 9, line 25, after the symbol and word "% total" insert --wt--.

Col. 10, line 17, after the words "15 to" insert --about--.

Col. 10, line 48, delete the word "fruitss" and insert --fruits--.

Signed and Sealed this

Tenth Day of November 1998

*Attest:*

BRUCE LEHMAN

*Attesting Officer*    Commissioner of Patents and Trademarks